March 6, 1951 H. F. RUNDELL 2,544,567
ELECTRICAL RESISTANCE PRESSURE RESPONSIVE GAUGE
Filed April 22, 1947 3 Sheets-Sheet 1
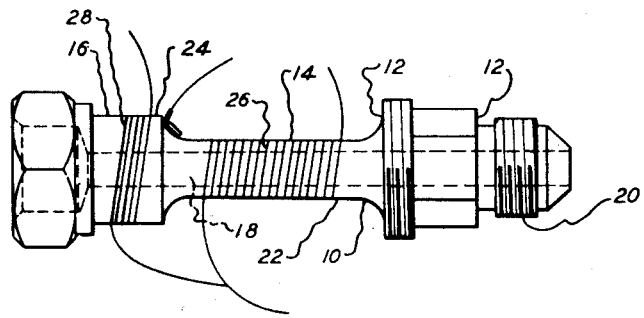
FIG. I.
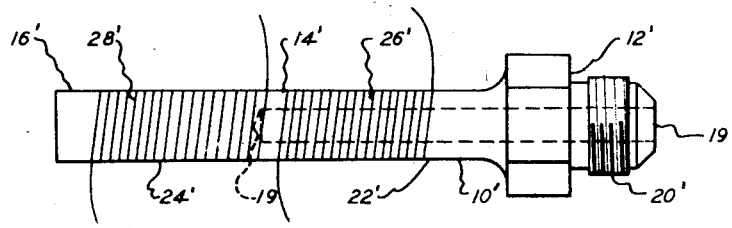
FIG. II.
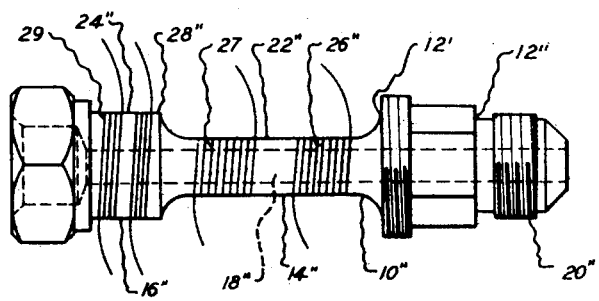
FIG. III.
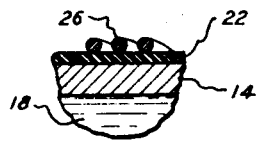
FIG. VI.
Inventor
HARWOOD F. RUNDELL
By Beaman & Patch
Attorneys

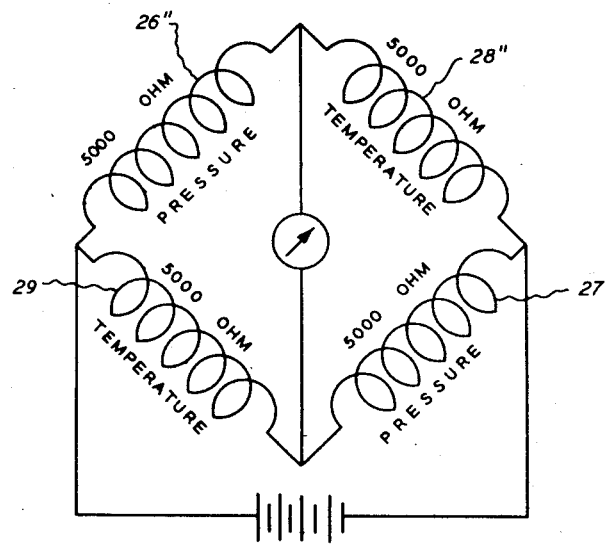
Fig. IV.
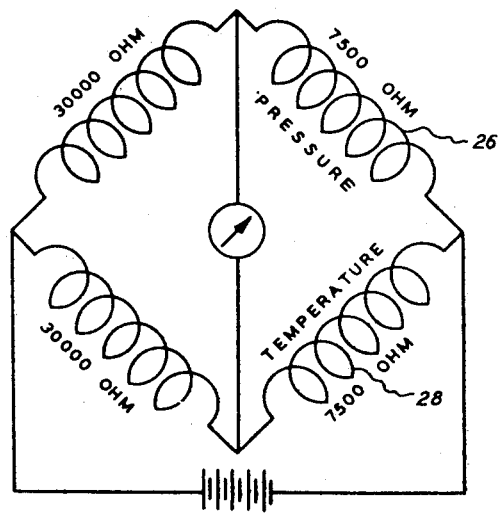
Fig. V.
Inventor
HARWOOD F. RUNDELL
By Beaman & Patch
Attorneys March 6, 1951 H. F. RUNDELL 2,544,567
ELECTRICAL RESISTANCE PRESSURE RESPONSIVE GAUGE
Filed April 22, 1947 3 Sheets-Sheet 3
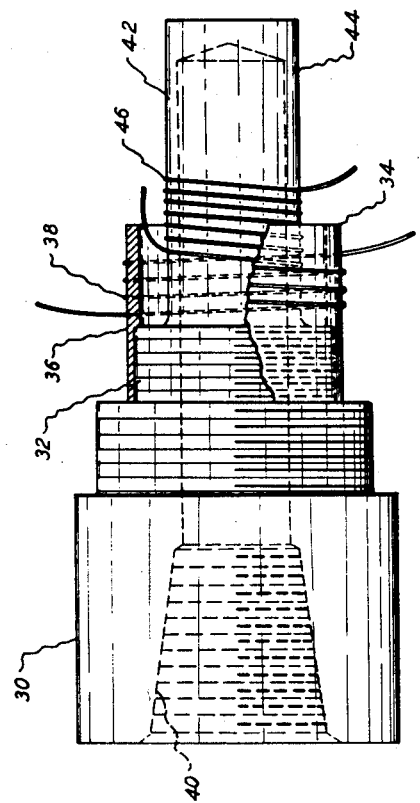
FIG. VII
Inventor
HARWOOD F. RUNDELL
By Beaman & Patch
Attorneys Patented Mar. 6, 1951

2,544,567

UNITED STATES PATENT OFFICE 2,544,567

ELECTRICAL RESISTANCE PRESSURE RESPONSIVE GAUGE

Harwood F. Rundell, Jackson, Mich., assignor to Aeroquip Corporation, Jackson, Mich., a corporation of Michigan Application April 22, 1947, Serial No. 743,215

11 Claims. (Cl. 201—63)

This invention relates to electric resistance press-responsive devices, and to the providing of such a device in which features of design have been incorporated to eliminate some of the objectionable performance characteristics of available devices of this type and other types used for similar service.

It is an object of this invention to provide an electric resistance pressure responsive device which has the ability to make direct and permanent static calibration which will be permanent.

A further object of the invention is to provide an electric resistance pressure responsive device employing an electric resistance filament which is sensitive and responsive to both fluid pressure and temperature changes in which the temperature changes are compensated for.

A further object is to provide such a device which will give a true response to pressure phenomena involving pressure changes of high rate and high frequency.

Another object is to provide such a device which will indicate a linear relation between pressure and the output of the device, which is a prime requisite for calibration purposes.

A further object is to provide such a device which has uniform response characteristics over the complete range of pressure from vacuum to high pressure for which the device is suitable.

A still further object is to provide such a device in which the output is not affected by mechanical shock and vibration incidental to the operation of the system in which pressures are being measured.

A still further object is to provide an electric resistance pressure responsive device the output of which is of considerable magnitude, thereby allowing the use of smaller amplification in a direct coupled amplifier with which the device is used.

The winding of the pressure responsive filament under tension eliminates the necessity for bonding the filament throughout its effective length to the surface on which it is wound, making it possible to fasten the ends where the lead wire connections are made, and leaving the rest of the filament free to react to changes in diameter of the cylinder on which it is wound.

The fact that the surface onto which the filament is wound is an electrical insulator makes it possible to eliminate the placing of a layer of insulating material between the filament and the cylinder. Besides being costly and time consuming in its application during the manufacturing process, this ordinary insulating material is relatively soft, and tends to yield under any increased tension in the filament resulting from the expansion of the cylinder wall under the influence of increasing pressures. This yielding introduces a lag in response, as well as a coefficient of hysteresis, both of which are inimical to the analysis of high speed pressure phenomena.

In order to accomplish the objectives stated above, it is not only necessary to provide a hard insulating surface on which the resistance filiment can be wound, but it was also necessary to devise an arrangement in which the juxtaposition of the pressure sensitive coil and the temperature compensating coil will permit instantaneous and constant temperature compensation regardless of degree, rate and direction of change of either ambient or internal fluid temperatures, or both. The various developments in the accomplishment of this object will be presented below, with their culmination in the device shown in Fig. VII of the drawings, which presents the basic construction devised to afford this extremely accurate temperature compensation which is effective regardless of rate, degree and/or direction of change either in ambient or internal fluid temperature. The basic concept consists in providing a coil which is responsive to temperature changes only, the temperature affecting the coil in such a way that the surface on which it is wound is responsive to temperature differentials in exactly the same manner and degree as the metal on which the pressure responsive filament is wound.

The amount of material in the ring on which the temperature compensation coil is wound may be determined empirically to suit the wall thickness of the particular element, in order to provide a rate of heat flow to the temperature compensation coil equal to that flowing to the pressure sensitive coil. In a dead-ended pick-up element, such as that shown in Fig. VII, the fluid in the bore of the element is stagnant, and likewise has a very low coefficient of heat conductivity in comparison with that of the material, which means that the greatest flow of heat to or from the respective resistance coils will occur through the material itself. Knowing this, it is possible to determine the amount of material in the temperature compensating ring and the positioning of that ring in order to obtain optimum temperature compensation.

The objects and advantages of my invention as well as those not stated above will appear from the following specification, when considered in connection with the appended claims and the accompanying drawings, in which Fig. I is a view in elevation of the tubular type of pressure responsive device, Fig. II is a view in elevation of the device constructed on a dead ended tube, Fig. III is a view of a tube such as in Fig. I, incorporating a double pressure coil and a double temperature compensation coil, Fig. IV is a diagram of a Wheatstone bridge circuit, used with the device shown in Fig. III, Fig. V is a diagram of a Wheatstone bridge circuit, using auxiliary high resistance, compensating and stabilizing coils, Fig. VI is a sectional view on an enlarged scale showing the close association of the pressure filament with the surface onto which it is tension wound, and Fig. VII is a view partially in section and partially in elevation of another form which my invention can take.

In the drawings the base cylinder 10 is constructed with a number of annular shoulders 12, a relatively thin bodied cylindrical center section 14, to hold the pressure filament 26, and a relatively thick bodied cylindrical section 16 to hold the temperature filament 28. As shown in Fig. I the tubular portion 18 extends completely through the base cylinder 10, and is fitted with threads 20, used to connect the base cylinder 10 with the pressure line to be tested. The outside surfaces 22 and 24 of the cylindrical portions 14 and 16 are anodized, to thereby give a very hard insulating coating or surface, which provides electrical insulation as well as a hard base to carry the pressure filament 26 and the temperature filament 28. The filaments 26 and 28 are preferably made of a wire of high specific resistance and very small diameter (.001), so that coils of a high value of total resistance, such as in the order of 6,000 to 10,000 ohms, may be obtained from a single layer winding of extremely short axial length. I also wind the filaments 26 and 28 under tension on the cylindrical portions 14 and 16, after the anodizing treatment is completed, to insure a continuous contact with the anodized surfaces 22 and 24, thereby to provide the ability to measure negative pressures, and to minimize hysteresis. The tension under which the filaments 26 and 28 are to be wound on the cylindrical portions 14 and 16 is sufficiently great to insure the operation of the device in that portion of the stress strain curve which is linear, thereby giving greater accuracy.

The wall thickness of the cylindrical portion 14 is determined by the pressure under which the device is to operate, and is made as thin as safety will allow. The wall thickness of the cylindrical portions 16 is relatively great, in order that the filament 28 will affect the reading on the oscilloscope only from the changes in size of the base cylinder 10 due to temperature variations, and not from the changes in size due to the pressure internal to the tubular portion 18.

What I have actually done, is to wrap an electrical conducting wire about a wall, the interior of which is subjected to a pressure, that wall being expanded by the pressure within its interior, and the expansion of the wall in turn expanding the wire wound thereon to vary its resistance. This fluctuation in resistance of the coil wound upon the wall provides a corresponding variation in the current flow through that resistance, thereby changing the voltage, which change can be measured in a Wheatstone bridge. The output of the Wheatstone bridge may be amplified and viewed on a cathode-ray type oscilloscope.

The modification shown in Fig. II comprises the base cylinder 10', shoulder portions 12', cylindrical portions 14' and 16', anodized surfaces 22' and 24', and filament windings 26' and 28'. The difference in this construction, however, lies in the fact that the aperture 18 does not extend throughout the length of the base cylinder 10', but dead ends prior to reaching a point beneath the cylindrical surface 16'. The aperture 18 is fitted with threads 20' to attach the element to the line to be tested, in the same manner as shown in the analyzer illustrated in Fig. I. The advantages in the design shown in Fig. II are that the device may be attached as a spur to the line to be tested, and also that there is an extremely small possibility of any pressure fluctuation being recorded in the temperature filament 28', by reason of the fact that the temperature filament 28' does not encircle the aperture 18.

The modification shown in Fig. III comprises the base cylinder 10", annular shoulders 12", cylindrical sections 14" and 16", the tubular center hole 18", the threads 20", and the anodized surfaces 22" and 24". The modification consists of winding two pressure filaments 26" and 27 on the cylindrical portion 14", and two temperature filaments 28" and 29 on the cylindrical portion 16". The pressure responsive device of Fig. III is used with the Wheatstone bridge circuit of Fig. IV with the four filaments 26", 27, 28" and 29 making up the bridge circuit. Manufacturing problems encountered in winding the filament coils 26", 27, 28" and 29 show that the Wheatstone bridge circuit of Fig. V is preferable for most work. This has cut the winding operation from four coils to two, and, with the proper external resistances, the two circuits are equivalent in output. The tension wound coils are particularly difficult to wind and dress, and by using only two coils on each pick-up element the manufacturing is simplified. The compensating coils are contained in the associated amplifier.

In Fig. VII I have illustrated a further modification of my invention, especially designed to compensate for rapid changes in temperature. There the base cylinder 30 is formed with an annular threaded shoulder 32, adapted to receive and support a projecting collar 34. The outer surface 36 of the collar 34 is anodized, and the temperature compensating coil 38 is wound thereon in the same manner as temperature coils 28 are wound above. The pressure receiving aperture 40 is dead ended so that fluid will flow past the pressure pick-up element, and pressure changes will be transmitted into aperture 40. The cylindrical portion 42, with the anodized surface 44 is the same as portion 14 in Fig. I, and provides the cylindrical area for winding the pressure filament 46. The advantage of this modification over those shown in Fig. I and Fig. II is that here the coils are placed in positions relative to each other, and relative to the masses of metal so that equal rates of flow of heat will be obtained, regardless of the source of heat. This will prevent unbalanced heat conditions which might be encountered in the use of the construction of Figs. I and II when rapid changes of temperature are taking place. This construction may likewise be adapted to receive the double filament hook-up shown in Fig. III. It is to be understood that the fluid in the aperture 40 will be relatively stagnant, and that heat transfer will take place principally from the flow of fluid past the end of the pressure element and not from fluid within the aperture 40.

Through experiment I have found that the anodized surfaces 22 and 24 provide an extremely hard base which will carry the filament and expand it accurately and evenly, while at the same time providing electrical insulation, and making the construction much cheaper than if the filament were to be secured to the cylindrical wall by means of some bonding material. Also in this construction I find that hysteresis is minimized, due to the fact that there are no large moving parts which will tend to introduce inertia factors into the readings. By incorporating the temperature filament 28 on a part of the pressure responsive device not subject to pressure, and yet subject to all temperature variations, I have been able to remove a troublesome variable from the analysis of high fluid pressure phenomena.

Having thus described my invention what I claim and desire to protect by Letters Patent is:

1. In a pressure analyzer, a pick-up element comprising a cylinder defining an aperture into which fluid under pressure may be introduced, a tension wound filament of high resistance and small diameter to react to pressure and temperature influences, a tension wound filament of high resistance and small diameter to react to temperature influences, an anodized surface on a relatively thin walled portion of said cylinder adapted to receive said first filament, an anodized surface on a relatively thick walled portion of said cylinder adapted to receive said second filament, and a Wheatstone bridge circuit comprised in part by said two filaments, the tension winding of said filaments being relied upon to maintain the desired intimate contact with the said cylinder surfaces, as distinct from the employment of bonding media, and the anodized cylinder surfaces upon which the filaments are wound rendering the surfaces sufficiently hard as to permit the use of considerable tension in the winding of the filaments, while affording efficient electrical insulation.

2. A pressure pick-up element comprising a cylinder defining an aperture into which pressure may be introduced, an anodized surfaced thin walled pressure responsive portion of said cylinder, an electrical resistance tension wound in close association with said portion, a second portion of said cylinder not responsive to pressure differences, and an electrical resistance element tension wound in close association with said second portion to respond to the effects of temperature variations, the tension winding of said electrical resistances being relied upon to maintain the desired intimate contact with the said cylinder portions, as distinct from the employment of bonding media, and the anodized cylinder surfaces upon which the resistances are wound rendering the surfaces sufficiently hard as to permit the resistances to be wound thereagainst under considerable tension while affording efficient electrical insulation.

3. A pressure pick-up element comprising a cylinder defining an opening into which pressure may be introduced, a pressure responsive wall in said cylinder, an anodized surface on said pressure responsive wall, and an electrical filament tension wound in close association with said anodized surface to respond to pressure variations within said cylinder, the tension winding of the filament being relied upon to maintain the filament in intimate contact with the anodized cylinder surface to the exclusion of any separate bonding medium and the said anodized surface being sufficiently hard as to permit the filament to be wound thereagainst under considerable tension while affording also adequate electrical insulation.

4. A pressure pick-up element comprising a cylinder into which fluid under pressure may be introduced, a relatively thin walled pressure responsive portion of said cylinder having a hard anodized surface, a pressure responsive electrical filament tension wound in close association with said cylinder surface and positioned to react to changes in pressure in said cylinder, and an electrical filament tension wound upon another hard anodized surface of said cylinder to respond to expansion and contraction of said cylinder during temperature changes.

5. A pressure pick-up element comprising a pressure responsive wall, a temperature responsive wall positioned to react to temperature changes at the same rate as said pressure responsive wall reacts to temperature changes and having a hard anodized surface, and a resistance element tension wound into intimate contact with said surface to measure reactions in said temperature responsive wall due to temperature changes, the tension winding of the resistance element being relied upon to maintain the resistance element in intimate contact with the anodized cylinder surface to the exclusion of any separate bonding medium and the said anodized surface being sufficiently hard as to permit the resistance element to be wound thereagainst under considerable tension while affording also adequate electrical insulation.

6. A pressure pick-up element comprising a pressure responsive wall having an anodized surface, a temperature responsive wall having an anodized surface, and resistance elements tension wound on said wall surfaces to react with the walls, said tension winding of the resistance elements being relied upon to maintain the elements in intimate contact with the anodized wall surfaces to the exclusion of any bonding medium and the said anodized surfaces being sufficiently hard as to permit the resistance elements to be wound thereagainst under considerable tension while affording also adequate electrical insulation.

7. A pressure pick-up element comprising a pressure responsive wall, a temperature responsive wall positioned to react to temperature changes at the same rate as said pressure responsive wall reacts to temperature changes and having an anodized surface, and a resistance element tension wound on the anodized surface of said temperature responsive wall to measure reactions therein due to temperature changes, said tension winding of the resistance element being relied upon to maintain the elements in intimate contact with the anodized wall surfaces to the exclusion of any bonding medium and the said anodized surfaces being sufficiently hard as to permit the resistance elements to be wound thereagainst under considerable tension while affording also adequate electrical insulation.

8. A pressure pick-up element comprising a pressure responsive wall having an anodized surface, a temperature responsive wall having an anodized surface and positioned to react to temperature changes at the same rate said pressure responsive wall reacts to temperature changes, a resistance element tension wound upon the anodized surface of said pressure responsive wall to measure reactions therein due to pressure changes, and a resistance element tension wound upon the anodized surface of said temperature responsive wall to measure reactions therein due to temperature changes, the tension winding of said resistance elements being relied upon to maintain the elements in intimate contact with the anodized wall surfaces to the exclusion of any bonding medium and the said anodized surfaces being sufficiently hard as to permit the resistance elements to be wound thereagainst under considerable tension while affording also adequate electrical insulation.

9. A pressure pick-up element comprising a pressure responsive wall having an anodized surface, a temperature responsive wall having an anodized surface and positioned to react to temperature changes at the same rate said pressure responsive wall reacts to temperature changes, a resistance element tension wound on the anodized surface of said pressure responsive wall to measure reactions therein due to pressure changes, and a resistance element tension wound on the anodized surface of said temperature responsive wall to measure reactions therein due to temperature changes, the tension winding of said resistance elements being relied upon to maintain the elements in intimate contact with the anodized wall surfaces to the exclusion of any bonding medium and the said anodized surfaces being sufficiently hard as to permit the resistance elements to be wound thereagainst under considerable tension while affording also adequate electrical insulation.

10. An electric pressure head comprising an elongated member having a chamber at one end adapted to be connected to a source of pressure, a strain-responsive wire element mounted about the exterior of said member in the proximity of said chamber, and a similar strain-responsive wire element mounted on a portion of said member which is not subjected to stress or strain due to pressure within said chamber.

11. An electric pressure head comprising a cylindrical member having a solid portion and a hollow portion, said hollow portion being provided with means for supplying pressure thereto, a strain-responsive wire element mounted on the exterior of said hollow portion of said cylinder, a similar wire strain-responsive element mounted on said cylinder about said solid portion, and means for connecting said strain-responsive elements to a balanced bridge circuit.

HARWOOD F. RUNDELL.

REFERENCES CITED

The following references are of record in the file of this patent:

UNITED STATES PATENTS

| Number | Name | Date |
| --- | --- | --- |
| 2,336,500 | Osterberg | Dec. 14, 1943 |
| 2,379,530 | Lederer | July 3, 1945 |
| 2,421,907 | Postlewaite | June 10, 1947 |